US006315853B1

(12) United States Patent
Kubota et al.

(10) Patent No.: US 6,315,853 B1
(45) **Date of Patent: *Nov. 13, 2001**

(54) METHOD FOR MANUFACTURING AN INK JET RECORDING HEAD

(75) Inventors: Masahiko Kubota, Tokyo; Masami Kasamoto, Ayase; Toshihiro Mori; Teruo Ozaki, both of Yokohama, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/721,311

(22) Filed: Oct. 15, 1996

(30) Foreign Application Priority Data

Oct. 13, 1995 (JP) .................................................. 7-265526

(51) Int. Cl.[7] ............................ B05D 5/12; B21D 53/76; G01D 15/00; B32B 31/00

(52) U.S. Cl. .......................... 156/257; 427/102; 427/103; 427/97; 427/120; 29/890.1; 216/27; 156/308.2; 156/309.6

(58) Field of Search ............................. 29/890.1; 347/63, 347/64, 65, 58; 216/27; 427/58, 101, 102, 103, 127, 130, 131, 97, 118, 120; 156/308.02, 309.6, 257

(56) References Cited

U.S. PATENT DOCUMENTS

| | | | |
|---|---|---|---|
| 4,313,124 | 1/1982 | Hara | 346/140 R |
| 4,345,262 | 8/1982 | Shirato et al. | 346/140 R |
| 4,459,600 | 7/1984 | Sato et al. | 346/140 R |

(List continued on next page.)

FOREIGN PATENT DOCUMENTS

| | | |
|---|---|---|
| 2843064 | 4/1979 | (DE) . |
| 0 390 338 | 10/1990 | (EP) . |
| 0 585 890 | 3/1994 | (EP) . |

(List continued on next page.)

OTHER PUBLICATIONS

Complete English Transl. of article "Method for Forming Single–Crystalline Al Wiring", Toshiba Review, vol. 48, No. 7 (1993), pp. 519–522.

(List continued on next page.)

*Primary Examiner*—Brian K. Talbot
(74) *Attorney, Agent, or Firm*—Fitzpatrick, Cella, Harper & Scinto

(57) ABSTRACT

A method for manufacturing an ink jet recording head by combining each of the processes to fabricate a heater board comprises (I) the first step of patterning a resistive layer on a substrate, (II) the second step of laminating a first protection layer and patterning the protection layer to form a groove by removing an area for wiring electrode layers to be formed later, (III) the third step of laminating a layer formed by material for use of the wiring electrode layers, (IV) the forth step of continuously giving heat treatment to the surface of the substrate, while the surface is not allowed to be exposed to the air outside, to enable the layer formed by the material of the wiring electrode layers to flow into only the groove on the first protection layer provided in the first step, and making the surface flat, as a result of which, a pair of electrode layers are formed to enable the resistive layer between them to be constituted as the heat generating unit and (V) the fifth step of forming a second protection layer. With this method of manufacture, it is possible to provide an ink jet recording head whose power dissipation is small, while having a good durability and capability of recording in high quality.

5 Claims, 13 Drawing Sheets

U.S. PATENT DOCUMENTS

| | | | | |
|---|---|---|---|---|
| 4,463,359 | | 7/1984 | Ayata et al. | 346/1.1 |
| 4,558,333 | | 12/1985 | Sugitani et al. | 346/140 R |
| 4,608,577 | | 8/1986 | Hori | 346/140 R |
| 4,723,129 | | 2/1988 | Endo et al. | 346/1.1 |
| 4,740,796 | | 4/1988 | Endo et al. | 346/1.1 |
| 4,936,952 | * | 6/1990 | Komuro | 347/64 |
| 4,968,992 | * | 11/1990 | Komuro | 347/64 |
| 5,081,474 | | 1/1992 | Shibata et al. | 346/140 R |
| 5,455,612 | * | 10/1995 | Ikeda et al. | 347/64 |
| 5,479,197 | * | 12/1995 | Fujikawa et al. | 347/63 |
| 5,491,505 | | 2/1996 | Suzuki et al. | 347/203 |
| 5,580,468 | | 12/1996 | Fujikawa et al. | 216/27 |
| 5,660,739 | * | 8/1997 | Ozaki et al. | 347/64 |

FOREIGN PATENT DOCUMENTS

| | | | |
|---|---|---|---|
| 0 603 822 | | 6/1994 | (EP) . |
| 0 636 478 | | 2/1995 | (EP) . |
| 54-51837 | | 4/1979 | (JP) . |
| 54-56847 | | 5/1979 | (JP) . |
| 59123670 | | 7/1984 | (JP) . |
| 59138461 | | 8/1984 | (JP) . |
| 60-71260 | | 4/1985 | (JP) . |
| 125858 | * | 6/1986 | (JP) . |
| 61125858 | | 6/1986 | (JP) . |
| 5-177836 | | 7/1993 | (JP) . |
| 5177836 | | 7/1993 | (JP) . |

OTHER PUBLICATIONS

"Method for Forming Single–Crystalline Al wiring"; Toshiba Review, vol. 48, No. 7, 1993.

Partial English Transl. of article "Method for Forming Single–Crystalline Al Wiring", Toshiba Review, vol. 48, No. 7 (1993), approx. p. 521, rt. col. line 23, through p. 522, left col, lines 1–8).

* cited by examiner

METHOD FOR MANUFACTURING AN INK JET RECORDING HEAD

BACKGROUND OF THE INVENTION

1. Field of the Invention

The present invention relates to a method for manufacturing an ink jet recording head, an ink jet recording head manufactured by such method, and an ink jet recording apparatus. More particularly, the invention relates to an ink jet recording head using a method whereby to create change of states of air bubbles generated in ink or the like by the application of thermal energy, and discharge ink from ink discharge ports following such change of states for the performance of recording.

2. Related Background Art

In recent years, more interest has arisen increasingly in recording by use of ink jet recording methods, because the generation of noises is small at the time of recording, which is almost negligible; recording is executable at high speeds; and also, recording is possible on an ordinary paper sheet without any particular treatment such as fixation, among other advantages.

Of these methods, an ink jet recording method disclosed in Japanese Patent Laid-Open Application No. 54-51837 and German Patent Laid-Open Publication (DOLS) No. 2,843,064, for example, has features different from those of other ink jet recording methods in that the disclosed method causes thermal energy to act upon ink to obtain active force for discharging ink droplets.

In other words, the recording method disclosed in the application or the publication referred to in the preceding paragraph is to enable thermal energy to act upon liquid (ink) so as to heat it rapidly and create air bubbles for discharging ink from ink discharge ports by means of the propagation of pressure waves in ink following the expansion and contraction of the respective air bubbles, thus enabling droplets to fly.

Particularly, the ink jet recording method disclosed in the German Patent Laid-Open Publication No. 2,843,064 has features that it is not only extremely effective when applied to a recording method of a so-called drop=on-demand type, but also, it is capable of obtaining high resolution, high quality images at high speeds, because the recording head unit used for this method is of a full-line type, which makes it easier to manufacture a highly densified multiple-orifice recording head.

FIGS. 12, 13A and 13B are views showing one example of the ink Jet recording head applicable to the recording method described above. FIG. 12 is a perspective view which shows the ink jet recording head. FIG. 13B is a plan view which shows a heater board provided with ink path walls. FIG. 13A is a cross-sectional view taken along line 13E—13E in FIG. 13B. This ink Jet recording head comprises ink discharge ports 18 each having an orifice structure arranged for discharging ink droplets; ink paths 11 conductively connected with the ink discharge ports; thermal activation units 8 provided, respectively, for the ink paths, respectively, for causing thermal energy to act upon ink; and electrothermal transducing elements. An electrothermal transducing element comprises a pair of wiring electrode layers 5a and 5b, a resistive layer 3 electrically connected with the wiring electrode layers that provide a heat generating unit 7 between the electrodes.

When ink is in contact with the heat generating unit 7 of the resistive layer 3, electric current flows through ink depending on the electrical resistive value of ink or corrosion or the like that may result from reaction between the heat generating unit of the resistive layer and ink, thus causing the resistive value of the resistive layer to change. Further, in some cases, damage or breakage may take place in this respect.

Conventionally, therefore, the resistive layer is formed by an inorganic material whose heat generating properties are excellent, such as an alloy of Ni, Cr, or the like or a metallic boride, such as $ZrB_2$, $HfB_2$, or the like, and then, on such resistive layer, a protection layer is arranged, which is formed by a material having a high resistance to oxidation, such as $SiO_2$.

A method for forming an electrothermal transducing element of the kind for an ink jet recording head is generally: after the resistive layer 3 is formed on a given substrate 1, the wiring electrode layers 5*a* and 5*b* are provided, and then, the protection layers 129*a*, 129*b*, and 139 are laminated one after another. Here, there is a need for the protection layers to cover the necessary portions of the resistive layer and wiring electrode layers evenly without any defect such as pin holes in order to enable them to function sufficiently to prevent the damages that may be given to the resistive layer, the short circuit that may take place across electrodes, and the like.

However, since the wiring electrode layers 5*a* and 5*b* are formed on the resistive layer 3, steps are formed at 10 between the wiring electrode layers and the resistive layer. If such steps are covered by the protection layer, the layer thickness tends to become irregular. Therefore, the protection layer should be made thick enough to cover the steps fully so as not to cause any portions to be exposed. Here, the exposed portions are liable to take place on the step portions in particular. Thus the thickness of the protection layer should be made more than needed (more than two times the thickness of the wiring electrode layer). If the step coverage is not good enough, there is a possibility that ink is in contact with the exposed portions of the resistive layer. If such takes place, ink is electrolyzed or the resistive layer is destroyed due to reaction between ink and the heat generating unit of the resistive layer. Also, on the step portions, film quality is easily made uneven. Such unevenness in film quality may invite the local concentration of thermal stresses exerted on the protection layer due to the repeated heat generation, hence leading to the creation of cracks on the protection layer. The occurrence of such cracks allow ink to enter them to cause damages to the resistive layer. Besides, there are some cases where cracks occur on the protection layer due to pin holes or hillocks developed from the electrode material when the protection layer is formed. Conventionally, in order to solve these problems, the protection layer is made thick to improve the step coverage, thus preventing the formation of cracks and pin holes.

However, to make the protection layer thick hinders heat supply to ink, although it contributes to the enhancement of step coverage. Consequently, there are encountered problems anew as given below.

In other words, whereas heat is transferred to the protection layer through ink in the heat generating unit of the resistive layer, the so-called heat resistance between the surface of the protection layer (thermoactive portion 8) serving as the acting surface of this heat and the heat generating unit 7 of the resistive layer becomes greater if the protection layer is made thick. As a result, it is required to provide the resistive layer with an electric load more than needed. This still leads to the problems given below: (i)

power saving becomes unfavorable, (ii) the excessive heat is accumulation on the substrate to make heat response inferior, and (iii) the material of the resistive layer is deteriorated (durability is lowered), among some others.

If only the protection layer is made thinner, these kinds of problems can be solved. However, it is not easy to make the protection layer thinner when forming it only by means of the conventional film formation method, such as sputtering or deposition, because the problem of durability is brought about due to the defective step coverage or the like.

With respect to recording by means of an ink jet recording head, it is generally known that the quicker ink is heated, the more is enhanced the stability of ink foaming. In other words, the shorter the pulse width of electrical signal (generally, electric pulses) that is applied to each electrothermal transducing element, the better is the foaming stability of ink. Thus, the discharging stability of flying droplets is enhanced to obtain a better recording quality. However, for the conventional ink jet recording head, the protection layer should be made thicker for the reasons described above. Therefore, the heat resistance of the protection layer becomes greater, which inevitably generates heat more than necessary. As a result, the deterioration of material (the lowered durability) ensues or the lowered heat response takes place due to the accumulation of excessive heat. Under such circumstances, therefore, it becomes difficult to make the pulse width shorter. Thus there is automatically limit to making recording quality higher after all.

Now, in order to reduce the dissipation of electric power, it is conceivable to reduce the loss of thermal energy on the wiring electrode layers by reducing the resistive value of the wiring electrode layers. More specifically, the width of an wiring electrode layer is made larger or the thickness of an wiring electrode layer is made larger, among some other methods. However, for the reasons given below, it is difficult to implement them.

(a) The width of the wiring electrode layer is confined by the arrangement density of nozzles (ink paths). For example, in a case of 300 DPI, one electrothermal transducing element should be formed in a space of 84.7 μm wide. Here, if the gap between the wiring electrode layers is made narrower in this space available, the width of each wiring electrode layer can be made larger. However, since the gap between the wiring electrode layers becomes narrower, the frequency of short circuit generation is increased between the wiring electrode layers when the layers are patterned. Then, its production yield is inevitably reduced.

(b) If the wiring electrode layer is made thicker, the thickness of the protection layer should be made larger accordingly. Also, in either cases of a sputtered film and a CVD film, its formation around the step portions becomes insufficient. As a result, the protection layer is formed unevenly. Then, due to cavitation to be generated when the air bubbles vanish or due to thermal stresses generated by repeated pulses, cracks tend to occur in the vicinity of steps on the protection layer.

In order to solve these problems, there has been proposed a method (see FIG. 14A) for burying the wiring electrode layers in a groove by forming such groove on a heat accumulation layer when the heat accumulation layer 2 is provided between the substrate 1 and the resistive layer 3. (Japanese Patent Laid-Open Application No. 61-125858.) In practice, however, the patterning accuracy should deviate by approximately 0.5 to 1 μm when the wiring electrode layers are patterned by means of photolithography technique or the like on such heat accumulation layer. As a result, the wiring electrode layer cannot bury the groove completely, and a gap is formed. Further, the wiring electrode layer is raised up to the outer surface of the groove to form a ridge portion as shown in FIG. 14B.

SUMMARY OF THE INVENTION

Now, therefore, it is an object of the present invention to provide a highly durable ink jet recording head whose power dissipation is smaller, while being able to provide an excellent responding capability to record in high quality, and to provide an ink jet recording apparatus having such recording head mounted on it.

In order to achieve this objective, the present inventor et all have made various researches and experiments to complete this invention.

A first invention relates to a method for manufacturing an ink jet recording head wherein a heater board is manufactured by means of a combination of each of the following:

(I) the first step of forming on a substrate a resistive layer that constitutes a heat generating unit to supply thermal energy to ink for discharging ink, and patterning the resistive layer.

(II) the second step of forming a first protection layer on the substrate after the first step, and patterning the protection layer to form a groove by removing an area for wiring electrode layers to be formed later.

(III) the third step of laminating a layer formed by material for use of the wiring electrode layers on the substrate after the second step so as to enable this layer to be in contact with the resistive layer.

(IV) the fourth step of continuously giving heat treatment to the surface of the substrate after the third step to enable the material for use of the wiring electrode layers to flow into the groove of the first protection layer formed in the second step, and of making the surface flat, as a result of which at least a pair of wiring electrode layers are formed so as to constitute the resistive layer between the pair of wiring electrode layers as the heat generating unit serving as an electrothermal transducing element.

(V) the fifth step of forming a second protection layer on the substrate after the fourth step.

A second invention relates to a method for manufacturing an ink jet recording head of the first invention, wherein the resistive layer is provided after the formation of a heat accumulation layer on the substrate in the first step thereof.

A third invention relates to a method for manufacturing an ink jet recording head wherein a heater board is manufactured by a combination of each of the following:

(I) the first step of forming a first protection layer on a substrate, and patterning the protection layer to form a groove by removing an area for wiring electrode layers to be formed later.

(II) the second step of laminating a layer formed by material for use of the wiring electrode layers on the substrate after the first step.

(III) the third step of continuously giving heat treatment to the surface of the substrate after the second step so as to enable the material for use of the wiring electrode layers to flow into the groove of the first protection layer formed in the second step, and making the surface flat, as a result of which at least a pair of wiring electrode layers are formed.

(IV) the fourth step of laminating the resistive layer, which forms a heat generating unit to supply thermal energy to ink for discharging ink, on the flat surface after the third step so as to connect it electrically with the pair of wiring electrode layers, and patterning the resistive layer, as a result of which the resistive layer between the pair of wiring electrode layers is constituted to be the heat generating unit serving as an electrothermal transducing element.

(V) the fifth step of forming a second protection layer on the substrate after the fourth step.

A fourth invention relates to a method for manufacturing an ink jet recording head of the third invention, wherein a first protection layer is provided after the formation of a heat accumulation layer on the substrate in the first step thereof.

A fifth invention relates to a method for manufacturing an ink jet recording head of the third invention, wherein a thin film formed by the material for use of wiring electrode layers is provided at least on an area of the substrate where the wiring electrode layers are formed before the formation of the first protection layer in the first step thereof.

A sixth invention relates to a method for manufacturing an ink jet recording head of the fourth invention, wherein a thin film formed by the material for use of wiring electrode layers is provided at least on an area on a heat accumulation layer where the wiring electrode layers are formed after the heat accumulation layer is provided on the substrate and before the formation of the first protection layer in the first step thereof.

A seventh invention relates to a method for manufacturing an ink jet recording head, wherein a heater board is manufactured by a combination of each of the following:

(I) the first step of forming a heat accumulation layer on a substrate, and patterning the heat accumulation layer to form a groove by removing an area for wiring electrode layers to be formed later.

(II) the second step of laminating a layer formed by the material for use of the wiring electrode layers on the substrate after the first step.

(III) the third step of continuously giving heat treatment to the surface of the substrate after the second step so as to enable the material for use of the wiring electrode layers to flow into the groove of the heat accumulation layer formed in the first step, and of making the surface flat, as a result of which at least a pair of wiring electrode layers are formed.

(IV) the fourth step of laminating the resistive layer, which forms a heat generating unit to supply thermal energy to ink for discharging ink, on the flat surface after the third step so as to connect it electrically with the pair of wiring electrode layers, and patterning the resistive layer, as a result of which the resistive layer between the pair of wiring electrode layers is constituted to be the heat generating unit serving as an electrothermal transducing element.

(V) the fifth step of forming a protection layer on the substrate after the fourth step.

The present invention includes an ink jet recording head manufactured by either one of the first to seventh inventions, and an ink jet recording apparatus having such ink jet recording head mounted on it.

For the resistive layer and protection layers of the present invention, known materials are used, and the layers are formed by means of high frequency (RF) sputtering or other sputtering method, chemical vapor deposition (CVD) method, vacuum deposition method, or the like, for example.

For the formation method of wiring electrode layers to be connected electrically with the resistive layer, it is possible to apply the same methods used for the formation of the resistive and protection layers. Such methods are the techniques developed for the formation of wiring for the ultra large scale integrated circuit (ULSI). In the Toshiba Review (Vol. 48, No. 7, 1993), a method for forming single-crystalline Al wiring is disclosed in detail in an article described in it. The advantage of this method is that a single-crystalline Al wiring can be formed by the method thus disclosed without any void or hillock. Also, as formation means, this method does not require the installation of a new film formation equipment such as disclosed in Japanese Patent Laid-Open Application No. 5-16369 and Japanese Patent Laid-Open Application No. 5-177836. It is possible to adopt the conventional film formation equipment for the achievement of the objective of the present invention just by modifying the equipment so that it can give heating at approximately 500° C. continuously after film formation.

In accordance with the method of manufacture of the present invention, it is possible to form wiring electrodes almost in the same thickness as that of the protection layer or the heat accumulation layer without creating any irregularities on the surface thereof that often take place in the conventional art. The surface of the wiring electrode layers and the protection layers or the heat accumulation layer can be made flat in accordance with the present invention. Therefore, even if the protection layer is made thinner when formed on this surface, it is possible to obtain a good step coverage, and eliminate the uneven film quality that may cause the creation of pin holes or cracks, thus significantly enhancing durability.

Also, with the thinner film thickness of the protection layer, it is possible to minimize the dissipation of energy by presence of the protection layer with respect to the thermal energy generated by the heat generating unit between the wiring electrode layers, hence contributing to the effective utilization of thermal energy for creating film boiling in ink.

In addition, since the protection layer is made thinner, the foaming of ink is stabilized to provide a better responding capability, and, in turn, the fluctuation of the ink discharging amount, the discharging speed, and the like is made smaller, hence making recording quality better.

Further, in accordance with the present invention, it is possible to make the wiring electrode layers thicker. The resistive value of the wiring electrodes themselves can be reduced accordingly, thus suppressing the voltage loss in this respect.

DETAILED DESCRIPTION OF THE PREFERRED EMBODIMENTS

Hereinafter, with reference to the accompanying drawings, the present invention will be described in detail.

FIGS. 1A to 2D are views showing one example of the respective steps in the method of manufacture of the first and second inventions hereof, respectively. FIGS. 1A to 1E are cross-sectional views of those shown in FIGS. 2A to 2D.

First step: on a substrate 1 formed by silicon, glass, ceramics, plastic, or the like, a resistive 10 layer 3, which is formed by an alloy of Ni, Cr, or the like, a metallic boride, such as $ZrB_2$, a metallic nitride, such as TaN, TaAl, or the like, is provided by means of vacuum deposition or sputtering. Then, patterning is executed by means of photolithography or some other known method.

Figure 1A:
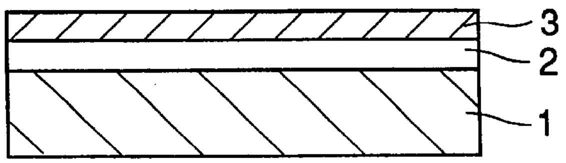
FIGS. 1A, 1B, 1C, 1D and 1E are cross-sectional views showing each step of a method of manufacture in accordance with the present invention.
Figure 2A:
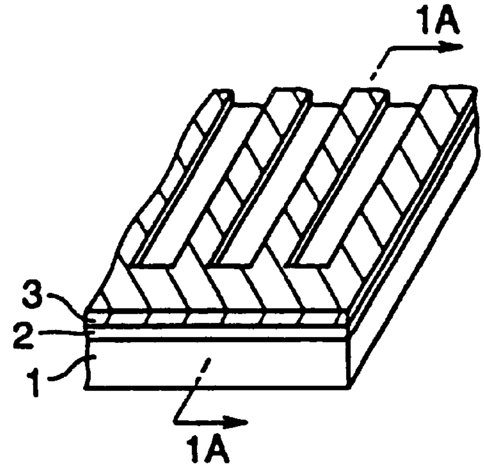
FIGS. 2A, 2B, 2C and 2D are perspective views showing each step of a method of manufacture in accordance with the present invention.
Figure 2B:
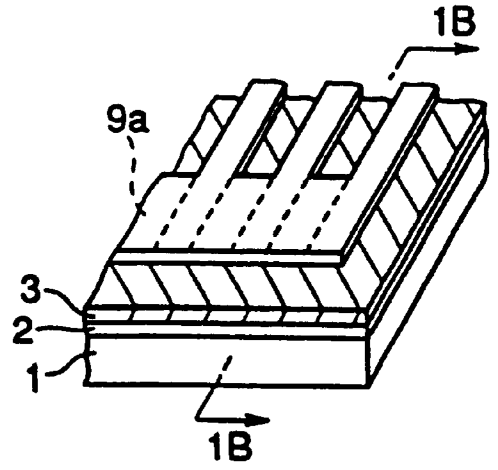
Figure 2C:
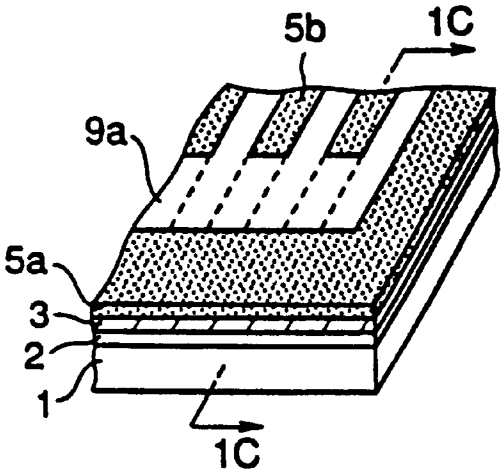
Figure 2D:
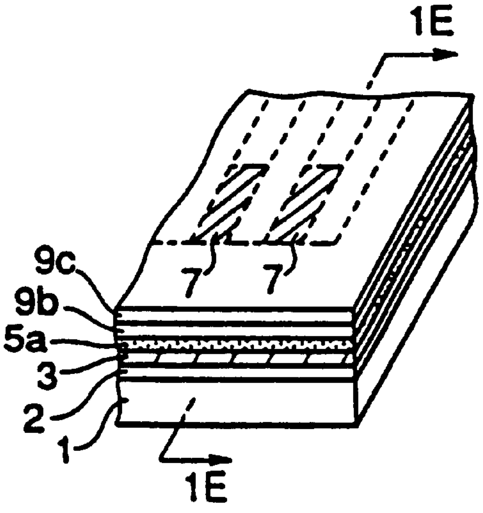

At this Juncture, it is preferable to provide a functional layer, such as a heat accumulation layer 2, between the substrate 1 and the resistive layer 3 (see FIG. 1A and FIG. 2A. Here, FIG. 1A is a cross-sectional view taken along line 1A—1A in FIG. 2A). This heat accumulation layer 2 is arranged to prevent the ink heating efficiency from being lowered, which takes place if heat generated by the heat generating unit 7 of the resistive layer 3 may escape to the substrate 1. For the heat accumulation layer 2, a material having a low heat conductivity, such as $SiO_2$, is used.

Figure 1B:
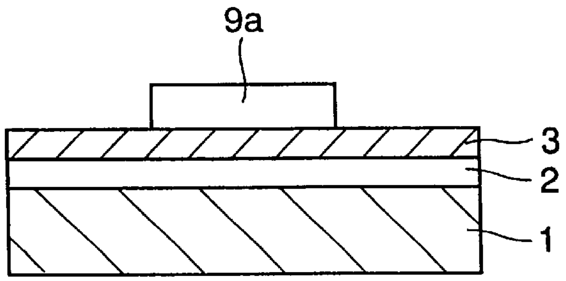
Figure 1C:
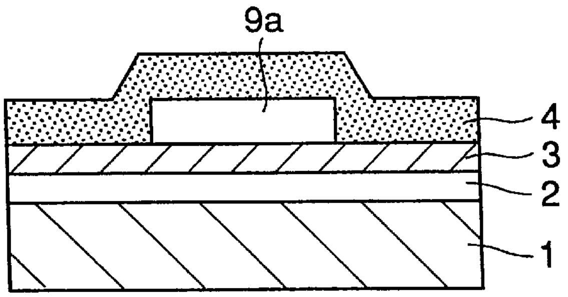

Second step: On the substrate where the resistive layer 3 has been patterned, a film formation is executed by means of sputtering, CVD, or the like using a material of $SiO_2$, $Si_3N_4$, or the like that is generally used as a material for an insulative protection layer in order to obtain its thickness in an amount substantially equal to that of the wiring electrode layers, which will be formed later. Then, by means of photolithography or the like, the film on the portion where the wiring electrode layers are formed is removed by means of etching (to form a groove). Thus, a protection layer A (9*a*) is provided as a first protection layer. At this juncture, since the resistive layer serves as an etching stop layer for the $SiO_2$ or $Si_3N_4$, there is no need for any severe control with respect to the execution of this etching. Also, in this way, a groove is produced on the protection layer A in the same shape as the pattern of electrodes to be formed later (see FIG. 1B and FIG. 2B. Here, FIG. 1B is a cross-sectional view taken along line 1B—1B in FIG. 2B).

Third step: On the substrate after the second step, a layer formed by material, such as Al, for use of wiring electrode layers is laminated by means of vacuum deposition, sputtering, or the like so as to connect it electrically with the resistive layer 3 (see FIG. 1C).

Figure 1D:
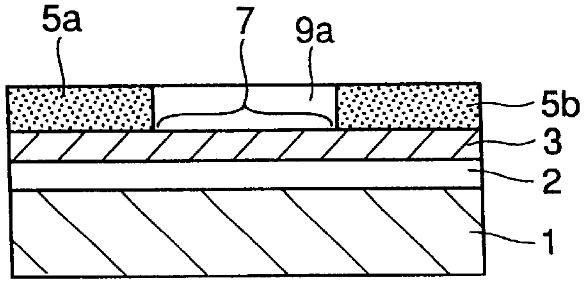

Forth step: in order to suppress the natural oxidation of the film surface of Al or the like, heat treatment is continuously given to the surface of the substrate preferably in vacuum so that it is not allowed to be exposed to the air outside at that time. If Al is used as the material of wiring electrode layers, it is preferable to apply heat at a temperature of 400° C. to 600° C., or more preferably at a temperature of approximately 500° C. By this heating, the layer formed by Al or other material for use of wiring electrode layers is in a state of being fused, and buried only in the groove (see FIG. 1D and FIG. 2C). As a result, the surface becomes flat, and a pair of wiring electrodes 5*a* and 5*b* are formed. At this Juncture, the resistive layer between the wiring electrode layers becomes a heat generating unit 7. In this respect, FIG. 1D is a cross-sectional view taken along line 1C—1C in FIG. 2C. Here, Al is used for the material of wiring electrode layers, but a metal, such as W, Au, Ag, or Cu may be equally usable. Also, if the material of wiring electrode layers still remains on the first protection layer at that time, and the surface is not made flat completely, the remaining material of the wiring electrode layers on the surface can be removed by means of inverted sputtering or the like. Then, the desirable surface condition is obtainable.

Figure 1E:
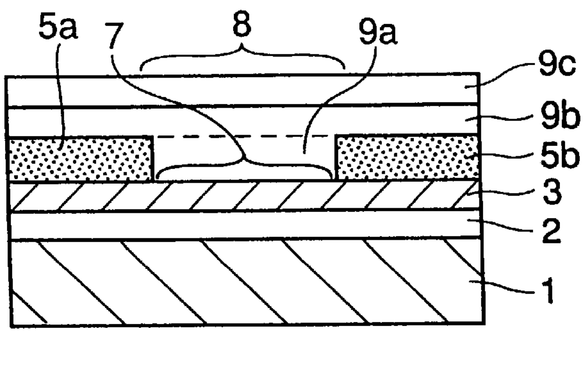

Fifth step: a second protection layer is formed on the substrate after the fourth step. Since the base of this second protection layer is flat, there is almost no possibility that any defects take place, and also, this layer can be made thinner sufficiently. The second protection layer may be a single layer if only insulation can be maintained across the electrodes or a multiple layer having two or more kinds of layers. For example, a protection layer B (9*b*) is formed by the same material of the protection layer A (9*a*) as a layer to provide protection against ink, and then, a protection layer C (9*c*) is formed as a layer for protection against cavitation (see FIG. 1E and FIG. 2D. Here, FIG. 1E is a cross-sectional view taken along line 1E—1E in FIG. 2D).

As shown in FIGS. 1A to 1E and FIGS. 2A to 2D, the heater board, which is manufactured by the first method of manufacture as described above in accordance with the present invention, comprises a substrate 1; a heat accumulation layer 2, which is provided as needed; a resistive layer 3 provided on the substrate or the heat accumulation layer; at least a pair of wiring electrode layers 5*a* and 5*b* electrically connected with the resistive layer; a first protection layer (protection layer A (9*a*)) formed on the portion having no wiring electrode layer, which is available between at least a pair of wiring electrode layers; and a second protection layer formed on the flat surface of the wiring electrode layers 5*a* and 5*b* and the first protection layer 9*a* (protection layer B (9*b*) and a protection layer C (9*c*), which is provided as needed). For a heater board of the kind, the resistive layer between the pair of wiring electrode layers 5*a* and 5*b* forms a heat generating unit 7 to supply thermal energy to ink for discharging ink. The heat generating unit is arranged corresponding to each of the ink paths connected with ink discharge ports. In this respect, a reference numeral 8 in FIG. 1E and FIG. 2D designates a thermoactive unit that supplies power to the heat generating unit 7 to transfer the generated heat to ink.

In accordance with the first and second inventions, the method of manufacture makes it possible to form the wiring electrode layers 5*a* and 5*b* substantially in the same thickness as that of the first protection layer (protection layer A (9*a*)) as described above. Therefore, unlike the conventional method, there are no irregularities on the surface of the portions where the wiring electrode layers are formed. Since the surface of the first protection layer 9*a* and that of the wiring electrode layers 5*a* and 5*b* are made flat, it is possible to eliminate the defects, such as caused by unevenness of layers, that may lead to the generation of pin holes or cracks when the protection layers are formed. Also, a good step coverage is obtainable even if the second protection layer of the present invention is made thinner. Here, therefore, it is good enough to make the thickness of the second protection layer a half of the thickness of the wiring electrode layers as in the specific embodiments to be described later, because there are no irregularities on the surface of the portion where the wiring electrode layers are formed. Also, as the film thickness of the protection layer is made thinner, it is possible to minimize the dissipation of energy by the presence of the protection layer with respect to the thermal energy generated by the heat generating unit that resides between the wiring electrode layers. Here, the thermal energy can be effectively utilized for creating film boiling in ink. Further, the Al, which is the material of wiring electrode layers, is single-crystallized as the result of heat treatment given as described above. Consequently, it becomes possible to prevent the generation of hillocks or whiskers. Also, the pin holes or the like of the resistive layer can be reduced by means of this heat treatment, which leads to the prolonged life of electrothermal transducing elements.

Figure 3:
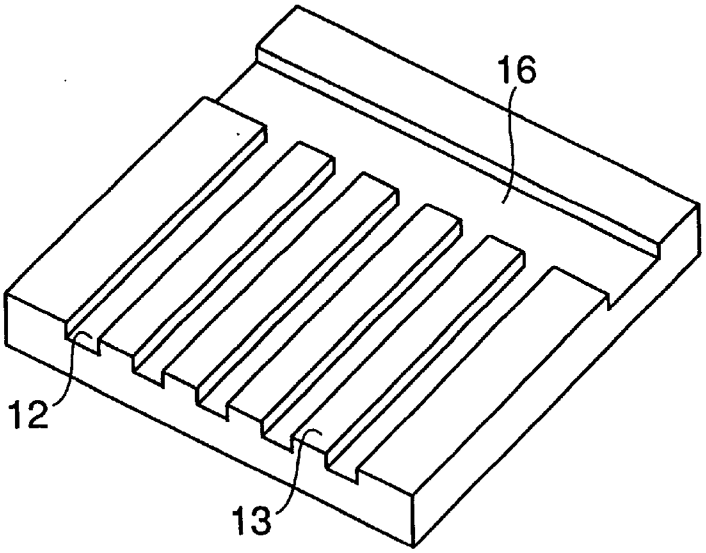
FIG. 3 is a perspective view showing the ceiling plate of an ink jet recording head in accordance with the present invention.
Figure 4:
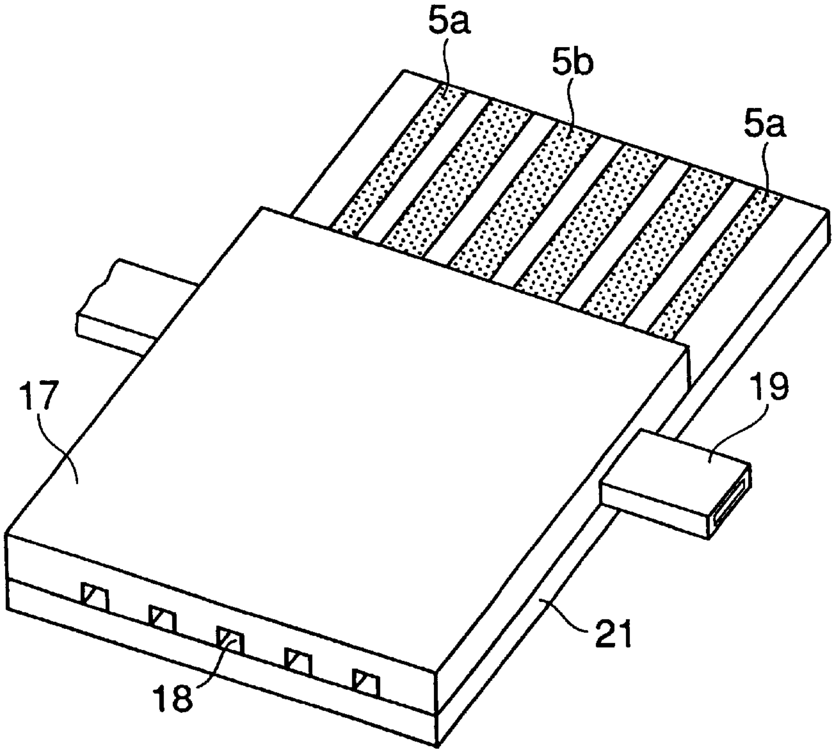
FIG. 4 is a perspective view showing an ink jet recording head in accordance with the present invention.

The heat board thus fabricated by the method of manufacture of the present invention enables the formation of an ink Jet recording head as shown in FIG. 4 when being combined with a ceiling plate shown in FIG. 3.

The ceiling plate may be structured so as to provided ink path walls (13) integrally formed with the ceiling plate by cutting the plate by use of a micro-cutter or the like to form grooves 12, which constitute ink paths as shown in FIG. 3, for example. Also, a groove 16 is provided for the ceiling plate to form a common liquid chamber for supplying ink, and then, an ink supply tube 19 may be connected to this groove as needed so that ink is induced to the recording head from the outside through this ink supply tube as illustrated in FIG. 4, for example. Also, when the ceiling plate 17 and the heater board 21 are bonded together, it is desirable to position the electrothermal transducing elements (heat generating units and others) to match exactly with the corresponding ink paths 11, respectively. With the arrangement described above, the ceiling plate 17 and the heater board 21 are bonded to form an ink jet recording head of the present invention, which is provided with the ink paths 11 conductively connected with ink discharge ports 18. In this respect, the wiring electrode layers 5*a* and 5*b* are additionally provided with lead substrates (not shown) having electrode leads to apply desired pulse signals from outside the recording head.

Figure 12:
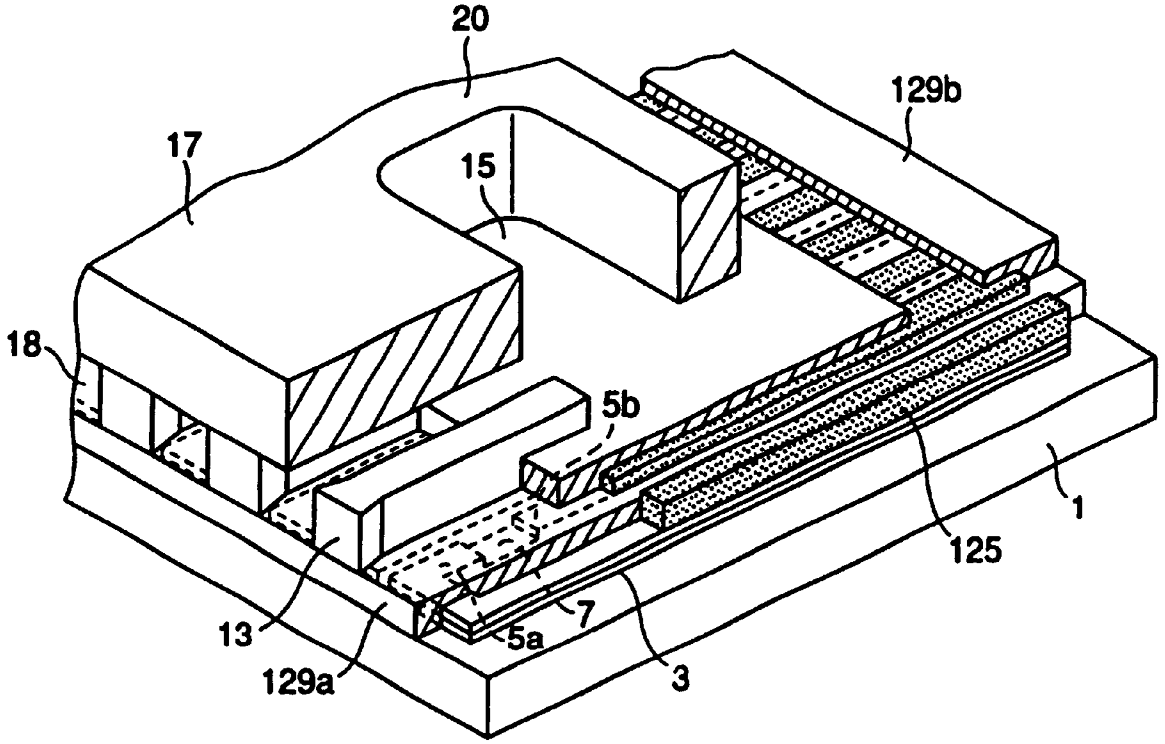
FIG.12 PRIOR ART
FIG. 12 is a view illustrating an ink jet recording head in accordance with the prior art.

The ink jet recording head of the present invention is not necessarily limited to the type shown in FIG. 4. For example, a type shown in FIG. 12 may be adoptable. Also, the formation of the ink discharge ports 18, ink paths 11, and the like, is not necessarily limited to the provisions of a grooved ceiling plate as shown in FIG. 4. It may be possible to form them by means of photosensitive resin patterning. Further, the present invention is not necessarily limited only to an ink jet recording head of a multiple array type having a plurality of ink discharge ports as described above. It is of course applicable to an ink jet recording head of a single array type having only one ink discharge port.

Figure 5:
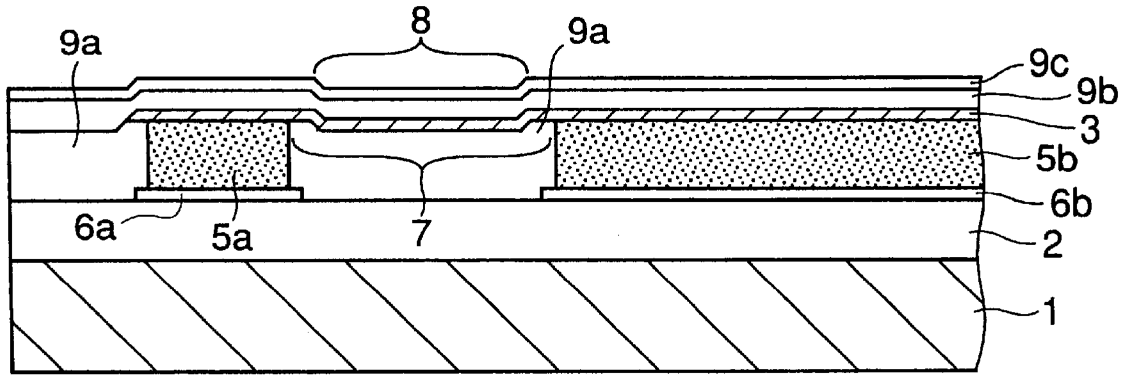
FIG. 5 is a cross-sectional view illustrating the heater board of an ink jet recording head in accordance with the present invention.
Figure 13A:
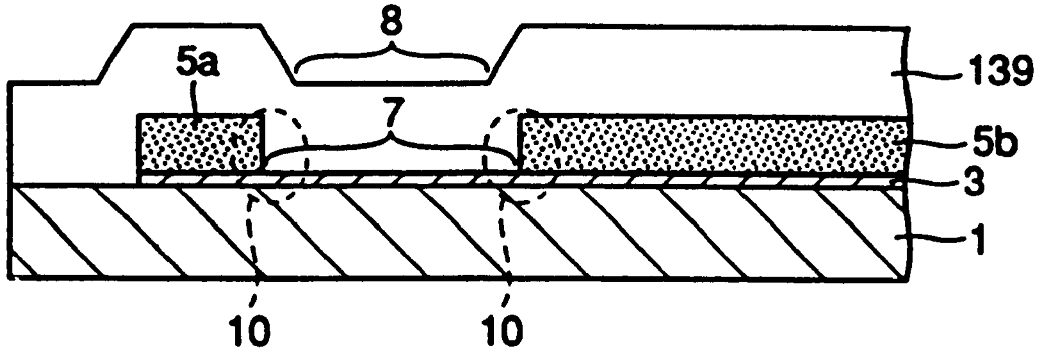
FIG.13A PRIOR ART
FIGS. 13A and 13B are views illustrating the heater board of an ink jet recording head in accordance with the prior art.
Figure 13B:
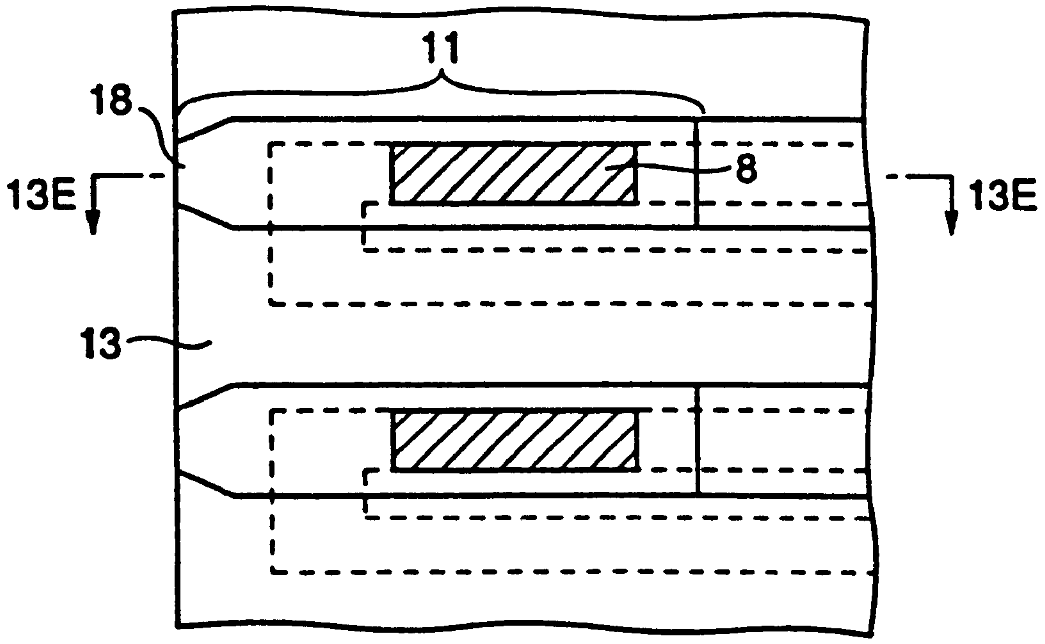
FIG.13B PRIOR ART
Figure 14A:
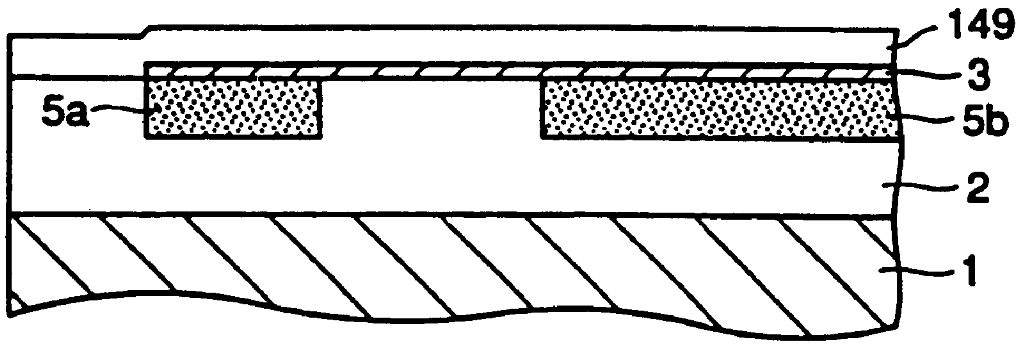
FIG.14A PRIOR ART
FIGS. 14A and 14B are views illustrating the heater board of an ink jet recording head in accordance with the prior art.
Figure 14B:
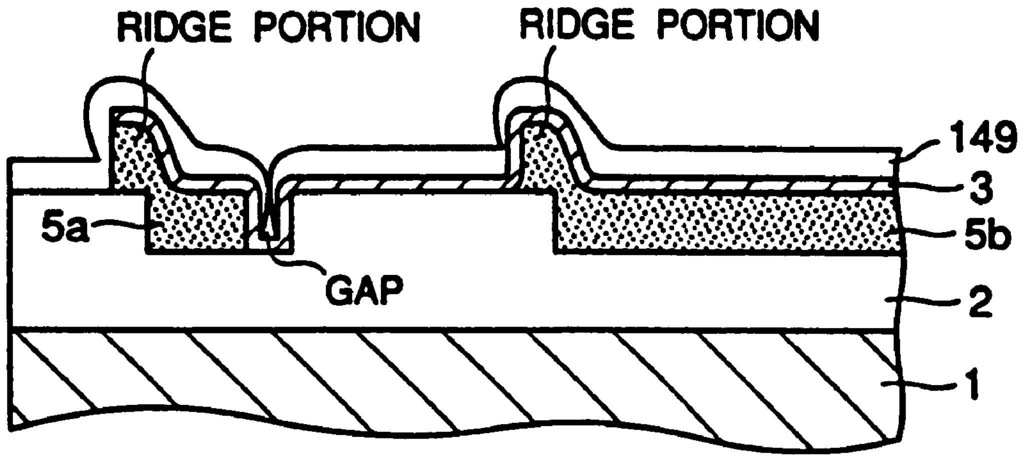
FIG.14B PRIOR ART

Now, FIG. 5 shows one example of a heater board produced by methods of manufacture in accordance with the third to sixth inventions hereof. The example shown in FIG. 5 corresponds to an ink jet recording head of a type shown in FIG. 12 and FIGS. 13A and 13B (with the exception of the heat accumulation layer, resistive layer, and protection layers, which are arranged differently). Here, FIG. 5 is a cross-sectional view taken along line 13E—13E in FIG. 13B.

This heater board comprises a substrate 1; a heat accumulation layer 2 provided on the substrate as needed; wiring electrode layers 5*a* and 5*b* and thin film electrode layers 6*a* and 6*b* provided on the substrate or the heat accumulation layer; a first protection layer (protection layer A (9*a*)) formed at least between a pair of wiring electrode layers and on the portion where no wiring electrode layers exist; a resistive layer 3 formed on the flat surface of the wiring electrode layers 5*a* and 5*b* and the first protection layer in a state of being electrically connected with the pair of wiring electrode layers 5*a* and 5*b*; and a second protection layer provided on the surface of the resistive layer (protection layer B (9*b*) and a protection layer C (9*c*), which is provided as needed).

The thin film electrode layers 6*a* and 6*b* are provided as needed, and formed at least on the substrate where the wiring electrode layers are formed or on the area where the heat accumulation layer is formed using the material of the wiring electrode layers.

The protection layer B serving as a second protection layer is formed by $SiO_2$ or the like, and is provided as a layer for protection against ink. This layer functions to shield the heat generating unit from ink. The protection layer C that is arranged on the protection layer B is formed by Ta or the like, and functions as a cavitation resistance layer to resist the cavitation to be generated when air bubbles vanish. In this respect, it may be possible to provide an intervention layer formed by Ta or other material (such as $Ta_2O_5$) between the upper and lower protection layers 9*b* and 9*c* in order to reinforce adhesion between them as required.

In the heater board described above, the resistive layer between the pair of wiring electrode layers 5*a* and 5*b* constitutes the heat generating unit 7 to supply thermal energy to ink for discharging ink. This heat generating unit is arranged on each of the corresponding ink paths connected to the ink discharge ports. In this respect, a reference numeral 8 designates a thermoactive unit that supplies power to the heat generating unit 7 and transfers the generated heat to ink.

Now, in conjunction with FIGS. 6A to 6D and FIGS. 7A to 7C, the description will be made of each of the steps of manufacturing the heater board described above.

First step (FIGS. 6A to 6C): A heat accumulation layer 2 is formed on a substrate 1 as required. If the heat accumulation layer is provided, a first protection layer is formed on it. If not, the first protection layer is provided on the substrate 1. The protection layer is patterned so as to form a groove by removing the area where wiring electrode layers to be formed later (the formation of the first protection layer (protection layer A (9*a*)).

Figure 6A:
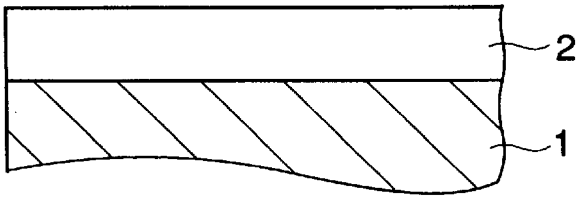
FIGS. 6A, 6B, 6C and 6D are cross-sectional views showing each step of a method of manufacture in accordance with the present invention.
Figure 6B:
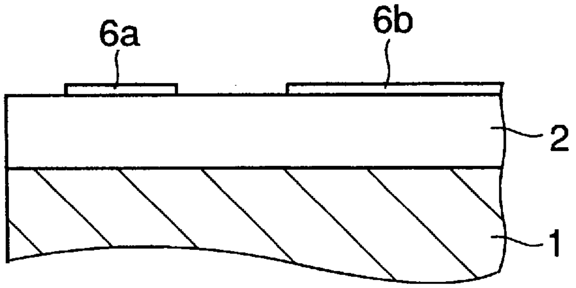
Figure 6C:
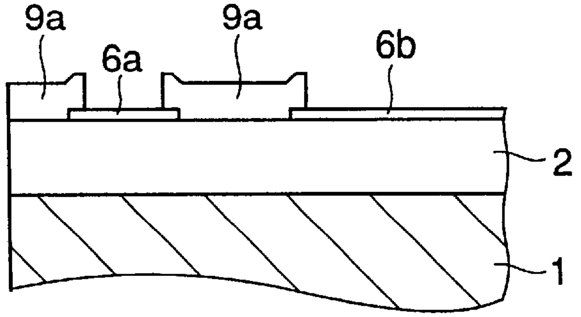

At this juncture, it may be possible to form the thin film electrode layers 6*a* and 6*b* by the material for use of wiring electrode layers at least on the substrate where the wiring electrode layers are formed or on an area on the heat accumulation layer. The thin film electrode layers function to be an etching stopper layer when patterning the first protection layer by means of etching using reactive etching method or the like. By use of a material, such as Al, which cannot be etched, it is made possible to prevent etching from being given more than necessary down to the heat accumulation layer or the substrate. In this respect, it is also possible to process a desired patterning by obtaining an etching rate in advance so that the etching is performed only for a period of time required to complete etching to a desired depth instead of providing the thin film electrode layers. Also, as shown in FIG. 6C, the thin film electrode layers 6*a* and 6*b* are positioned underneath the circumference of the first protection layer 7*a* so as to be overlapped therewith. The reason why this arrangement is made is that: when the first protection layer is patterned to be formed, the heat accumulation layer residing underneath the protection layer or a part of the substrate may be exposed by possible patterning deviation, while such exposed portion should be protected from being etched.

Second step (FIG. 6D): A layer 4 formed by Al or other material for use of wiring electrode layers is laminated on the substrate after the first step by means of vacuum deposition, sputtering, or some other method.

Third step (FIG. 7A): In order to suppress the natural oxidation of the film surface, such as Al, heat treatment is continuously given after the second step, while it is not allowed to be exposed to the air outside, and then, the material for use of wiring electrode layers is caused to flow into only the groove of the first protect layer formed in the first step. The surface is made flat, and at least a pair of wiring electrode layers 5*a* and 5*b* are formed. At this juncture, if the material of the wiring electrode layers still remain on the first protection layer so that the surface cannot be made sufficiently flat, the material of wiring electrode layers should be removed by means of inverted sputtering or the like. Then, it is possible to obtain the surface in a desirable state.

Fourth step (FIG. 7B): A resistive layer 3, which forms the heat generating unit 7 to supply thermal energy to ink for discharging ink, is formed on the flat surface after the third step so as to electrically connect it with the pair of wiring electrode layers 5*a* and 5*b*. Then, the resistive layer is patterned so as to constitute the resistive layer between the pair of wiring electrode layers as the heat generating unit 7 serving as an electrothermal transducing element.

Fifth step (FIG. 7C): A protection layer B (9*b*) is formed on the substrate after the fourth step as a second protection layer. If required, a protection layer C (9*c*) is also formed.

In accordance with the methods of manufacture of the third to six inventions hereof it is possible to form the wiring electrode layers 5*a* and 5*b* substantially in the same thickness as that of the first protection layer (9*a*). Therefore, unlike the conventional layers, there are no irregularities on the surface where the wiring electrode layers are formed. Since the surfaces of the first protection layer 9*a* and the wiring electrode layers 5*a* and 5*b* can be made flat, it is possible to laminate the resistive layer on them flatly and uniformly. The flat and uniform formation of the resistive layer makes it possible to obtain a good step coverage even if the laminated second protection layer is made thinner.

The heater board produced by the method of manufacture of the present invention is assembled as shown in FIGS. 8A to 8D to form an ink jet recording head, for example.

Figure 8A:
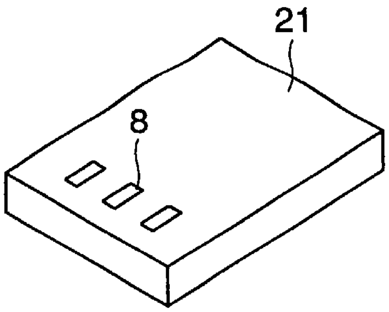
FIGS. 8A, 8B, 8C and 8D are views showing each step of a method of manufacture in accordance with the present invention.
Figure 8B:
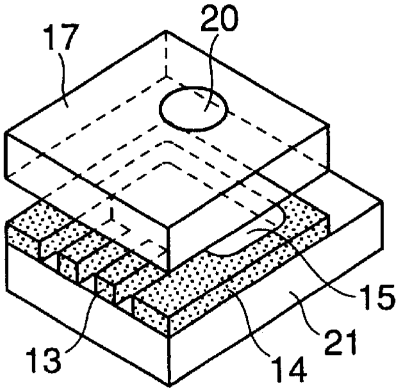

FIG. 8A is a schematic view which shows a heater board 21 provided with thermoactive units 8. On this heater board, a ceiling plate 17 formed by a hard film of photosensitive resin, which comprises ink path walls 13, outer frame 14, and ink supply inlet 20, is assembled (see FIG. 8B). A filter (not shown) may be provided for the ink supply inlet.

Figure 8C:
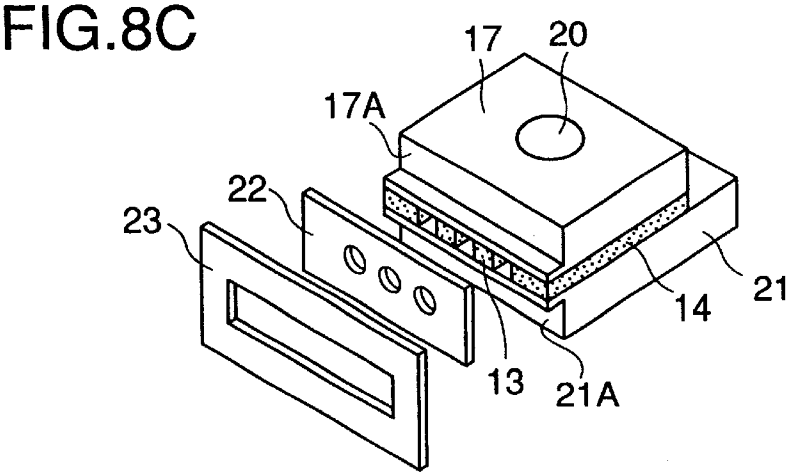
Figure 8D:
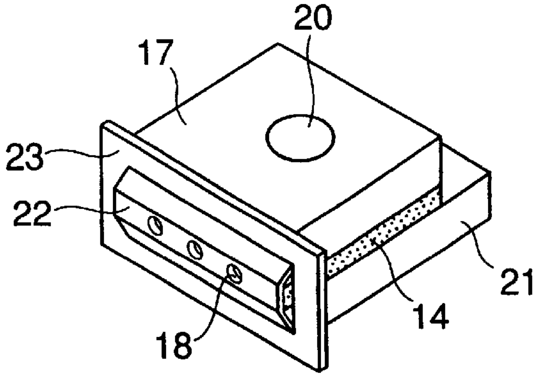

Then, in order to optimize the gap between ink discharge ports 18 and the thermoactive units 8, the vicinity of the ink discharge ports is cut off to give cutting finish by use of a diamond cutting grinder or the like, hence processing it to be in a shape having faces at 17A and 21A in FIG. 8C.

An orifice plate 22 is adhesively bonded to a metallic thin plate 23 in advance. This piece formed by integrating the orifice plate and the thin plate together is bonded to the faces at 17A and 21A after positioning the orifices of the orifice plate and the apertures of the portion processed as described earlier. In this way, the orifice plate is in contact closely with the surface of the recording head main body where the apertures are arranged in a state that tension is given to the plate (see FIG. 8D). In accordance with the present invention, an ink Jet recording head is fabricated as described above, but it may be possible to arrange the patterning of wiring electrode layers or the like as shown in FIGS. 2A to 2D so as to produce an ink jet recording head as shown in FIG. 3 and FIG. 4.

Figure 9:
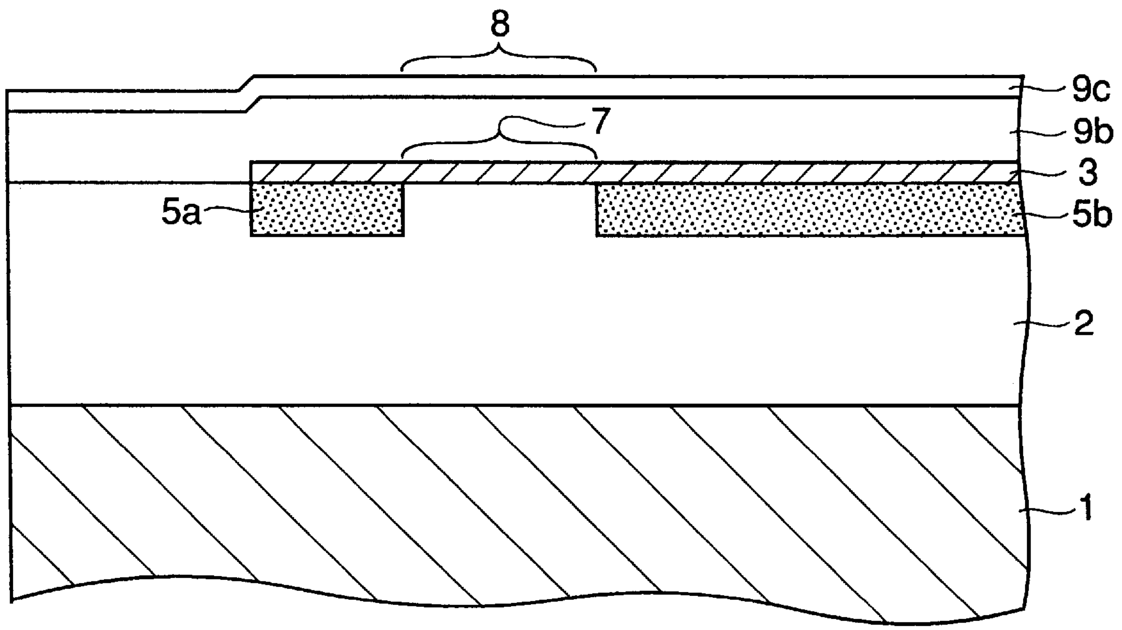
FIG. 9 is a cross-sectional view illustrating the heater board of an ink jet recording head in accordance with the present invention.

Now, FIG. 9 shows one example of a heater board produced by the method of manufacture in accordance with a seventh invention hereof. The example shown in FIG. 9 corresponds to the ink jet recording head of a type shown in FIG. 12 and FIGS. 13A and 13B (with the exception of the heat accumulation layer, resistive layer, and protection layers, which are arranged differently). FIG. 9 is a cross-sectional view taken along line 13E—13E in FIG. 13B.

This heater board comprises a substrate 1; a heat accumulation layer 2 having a groove formed by removing an area for wiring electrode layers; wiring electrode layers 5*a* and 5*b* provided for the groove on the heat accumulation layer; a resistive layer 3 formed on the flat surface of the wiring electrode layers 5*a* and 5*b* and the heat accumulation layer so as to connect it electrically with a pair of wiring electrode layers 5*a* and 5*b*; and protection layers on the surface of this resistive layer (protection layer B (9*b*) and protection layer C (9*c*) to be arranged as required).

The protection layer B serving as a second protection layer is formed by $SiO_2$ or the like, and is provided as a layer for protection against ink. This layer functions to shield the heat generating unit from ink. The protection layer C that is arranged on the protection layer B is formed by Ta or the like, and functions as a cavitation resistance layer to resist the cavitation to be generated when air bubbles vanish. In this respect, it may be possible to provide an intervention layer formed by Ta or other material (such as $Ta_2\ O_5$) between the upper and lower protection layers 9*b* and 9*c* in order to reinforce adhesion between them as required.

In the heater board described above, the resistive layer between the pair of wiring electrode layers 5*a* and 5*b* constitutes the heat generating unit 7 to supply thermal energy to ink for discharging ink. This heat generating unit is arranged on each of the corresponding ink paths connected to the ink discharge ports. In this respect, a reference numeral 8 designates a thermoactive unit that supplies power to the heat generating unit 7 and transfers the generated heat to ink.

Now, in conjunction with FIGS. 10A to 10D and FIGS. 11A and 11B, the description will be made of each of the steps of fabricating the heater board described above (method of manufacture in accordance with the seventh invention).

First step (FIGS. 10A and 10B): A heat accumulation layer 2 is formed on a substrate 1, and then, the heat accumulation layer is patterned to provide a groove by removing an area for wiring electrode layers to be formed later.

Second step (FIG. 10C): A layer 4 formed by Al or other material for use of wiring electrode layers is laminated on the substrate after the first step by means of vacuum deposition, sputtering, or some other method.

Third step (FIG. 10D): In order to suppress the natural oxidation of the film surface, such as Al, heat treatment is continuously given after the second step, while it is not allowed to be exposed to the air outside, and then, the material for use of wiring electrode layers is caused to flow into only the groove of the first protect layer formed in the first step. The surface is made flat, and at least a pair of wiring electrode layers 5*a* and 5*b* are formed.

Fourth step (FIG. 11A): A resistive layer 3, which forms the heat generating unit 7 to supply thermal energy to ink for discharging ink, is formed on the flat surface after the third step so as to electrically connect it with the pair of wiring electrode layers 5*a* and 5*b*. Then, the resistive layer is patterned so as to enable the resistive layer between the pair of wiring electrode layers to be constitutes as the heat generating unit 7 serving an electrothermal transducing element.

Fifth step (FIG. 11B): A protection layer B (9*b*) is formed on the substrate after the fourth step as a protection layer. If required, a protection layer C (9*c*) is also formed.

The method of manufacture in accordance with the seventh inventions hereof causes the wiring electrode layers 5*a* and 5*b* to flow into the groove of a given configuration on the heat accumulation layer. Thus, unlike the conventional layers, there are no irregularities on the surface where the wiring electrode layers are formed. Therefore, the surfaces of the wiring electrode layers 5*a* and 5*b* and the heat accumulation layer can be made flat, and also, it becomes possible to laminate the resistive layer on them flatly and uniformly. The flat and uniform formation of the resistive layer makes it possible to obtain a good step coverage even if the protection layer laminated thereon is made thinner.

The heater board produced by the method of manufacture of the present invention is assembled as shown in FIGS. 8A to 8D to form an ink jet recording head, for example. Also, it may be possible to arrange the patterning of wiring electrode layers or the like as shown in FIGS. 2A to 2D so as to manufacture an ink jet recording head as shown in FIG. 3 and FIG. 4.

Of the ink jet recording apparatuses, the present invention demonstrates particularly excellent effects when it is applied to a recording head and recording apparatus using a method wherein means is provided for generating thermal energy as energy to be utilized for discharging ink (electrothermal transducing elements, means for generating laser beams, or the like, for example) to create change of states in ink by the application of such thermal energy. By the adoption of this method, it is possible to attain the performance of recording in high density and in high precision as well.

Regarding the typical structure and operational principle of such method, it is preferable to adopt those which can be implemented using the fundamental principle disclosed in the specifications of U.S. Pat. Nos. 4,723,129 and 4,740,796, for example. This method is applicable to the so-called on-demand type recording system and a continuous type recording system as well. Particularly, however, the method is suitable for the on-demand type because the principle is such that at least one driving signal, which provides a rapid temperature rise beyond a departure from nucleation boiling point in response to recording information, is applicable to an electrothermal transducing element disposed on a liquid (ink) retaining sheet or liquid passage whereby to cause the electrothermal transducing element to generate thermal energy to produce film boiling on the thermoactive portion of recording means (recording head), thus effectively leading to the resultant formation of a bubble in the recording liquid (ink) one to one in response to each of the driving signals. By the development and contraction of the bubble, the liquid (ink) is discharged through a discharge port to produce at least one droplet. The driving signal is more preferably in the form of pulses because the development and contraction of the bubble can be effectuated instantaneously and appropriately. Therefore, the liquid (ink) is discharged with quicker response. The driving signal in the form of pulses is preferably such as disclosed in the specifications of U.S. Pat. Nos. 4,463,359 and 4,345,262. In this respect, the temperature increasing rate of the thermoactive surface is preferably such as disclosed in the specification of U.S. Pat. No. 4,313,124 for an excellent recording in a better condition.

The structure of the recording head may be as shown in each of the above-mentioned specifications wherein the structure is arranged to combine the discharging ports, liquid passages, and the electrothermal transducing elements (linear type liquid passages or right-angled liquid passages). Besides, the structure such as disclosed in the specifications of U.S. Pat. Nos. 4,558,333 and 4,459,600 wherein the thermal activation portions are arranged in a curved area is also included in the present invention.

In addition, the present invention is effectively applicable to the structure disclosed in Japanese Patent Laid-Open Application No. 59-123670 wherein a common slit is used as the discharging ports for plural electrothermal transducers, and to the structure disclosed in Japanese Patent Laid-Open Application No. 59-138461 wherein an aperture for absorbing pressure wave of the thermal energy is formed corresponding to the discharge ports. In other words, it is possible to perform recording reliably and more effectively in accordance with the present invention irrespective of the modes of recording heads.

Further, the present invention is effectively applicable to a recording head of full-line type having a length corresponding to the maximum width of a recording medium recordable by the recording apparatus. For such recording head, it may be possible to adopt either a structure whereby to satisfy the required length by combining a plurality of recording heads or a structure arranged by one recording head integrally formed.

Also, for the present invention, it is preferable to additionally provide a recording head with recovery means and preliminarily auxiliary means as constituents of the recording apparatus because these additional means will contribute to making the effectiveness of the present invention more stabilized. To name them specifically, these are capping means, cleaning means, wiping member, suction or compression means, preheating means such as electrothermal transducing elements or heating elements other than such transducing elements or the combination of those types of elements, and a predischarge means for performing discharge other than the regular discharge with respect to the recording head.

Also, regarding the kinds and numbers of ink jet recording heads to be mounted, the present invention is not only applicable a recording mode in which only one recording head is provided for use of one monochromic ink, but also to an apparatus having plural recording heads provided for use of plural kinds of ink in different colors or in densities. In other words, the present invention is extremely effective in applying it to an apparatus provided with at least one of various recording modes using a multi-color of different colors or a full-color of mixed colors, irrespective of whether the recording heads are integrally structured or it is structured by a combination of plural recording heads.

In the present invention described above, while ink has been described as liquid, such ink may be the one that can be solidified below the room temperature but liquefied at the room temperature. Since ink is generally controlled within the temperature not lower than 30° C. and not higher than 70° C. for the ink jet method in order to stabilize its viscosity for the execution of stable discharge, the ink may be such as to be liquefied when the applicable recording signals are given. In addition, while positively preventing the temperature rise due to the thermal energy by use of such energy as an energy to be consumed for changing states of ink from solid to liquid, or by use of the ink which will be solidified when left intact for the purpose of preventing the ink from being evaporated, it may be possible to adopt for the present invention the use of an ink having a nature of being liquefied only by the application of thermal energy, such as ink capable of being discharged as ink liquid by enabling itself to be liquefied anyway when the thermal energy is given in accordance with recording signals, and also, a kind of ink that will have already begun solidifying itself by the time it reaches a recording medium. In such a case, it may be possible to retain ink in the form of liquid or solid in the recesses or through holes of a porous sheet such as disclosed in Japanese Patent Laid-Open Application No. 54-56847 or 60-71260 in order to enable such ink to face the electrothermal transducing elements. In the present invention, the most effective method applicable to various kinds of ink mentioned above is the one capable of implementing the film boiling method as described above.

Moreover, as the mode of the recording apparatus of the present invention, it may be possible to adopt a copying apparatus combined with a reader, in addition to the image output terminal for a computer or other information processing apparatus. Also, it may be possible to adopt a mode of a facsimile equipment having transmitting and receiving functions.

Hereinafter, the further description will be made of the specific embodiments in accordance with the present invention. However, it is to be understood that the invention is not limited to the embodiments given below.

Embodiment 1

First step: On a substrate 1 formed by Si (silicon), a heat accumulation layer 2, which is formed by $SiO_2$ in a thickness of 2.5 μm, is provided, and then, on this heat accumulation layer, a resistive layer 3 formed by TaN is provided by means of sputtering in a thickness of 1,000 angstrom. Then, the resistive layer 3 is patterned by means of photolithography so that the size of heat generating unit 6*a* is 40 μm wide and 100 μm long. At the same time, a pattern is formed as a under coating layer for wiring electrode layers to be formed later (see FIG. 1A and FIG. 2A).

Second step: On the surface where this pattern is formed, a film of $SiO_2$ is formed by use of an RG sputtering equipment in a thickness of 1,000 angstrom, and then, patterned by means of photolithography to remove the portion of $SiO_2$ film where wiring electrode layers to be formed. Thus, a protection layer A (9*a*) is formed as a first protection layer (see FIG. 1B and FIG. 2B).

Third step: By means of sputtering, an Al film is formed in a thickness of 3,000 angstrom (see FIG. 1C).

Forth step: The surface of the Al film is heated continuously, while it is not allowed to be exposed the air outside (at 500° C. for 45 seconds). In this way, only the groove on the pattern of the protection layer A (9*a*) is buried by Al. Thus, the wiring electrode layers 5*a* and 5*b* are formed (see FIG. 1D and FIG. 2C).

Fifth step: By means of RF sputtering, a film of $SiO_2$ is formed in a thickness of 1,000 angstrom to make a protection layer B (9*b*) as a second protection layer. Then, for the purpose to enhance the resistance of the protection layer B against cavitation, a film of Ta is formed by means of sputtering in a thickness of 2,000 angstrom as a protection layer C (9*c*) (see FIG. 1E and FIG. 2D).

The heater board fabricated as described above is bonded to a ceiling plate as shown in FIG. 3, thus producing an ink jet recording head as shown in FIG. 4.

Embodiment 2

First step: An Si wafer is prepared as a substrate 1. Then, on the Si wafer, an $SiO_2$ heat accumulation layer 2 is deposited by means of thermal oxidation in a film thickness of 1 μm (see FIG. 6A).

Then, by means of sputtering, a film of Al is formed on the heat accumulation layer 2 in a thickness of 200 angstrom. After that, it is patterned by the photography technique as shown in FIG. 6B to form thin film electrode layers 6*a* and 6*b* are formed. In continuation, a film of $SiO_2$ is laminated by means of sputtering in a thickness of 10,000 angstrom on the heat accumulation layer 2 including the Al thin film electrode layer 6*a* and 6*b* thus formed. After that, resist is provided by the photolithography technique on this $SiO_2$ film. This resist is formed in the same shape as the thin film electrode layers 6*a* and 6*b*, but its dimension is made slightly smaller than that of the thin film electrode layers 6*a* and 6*b*. The $SiO_2$ film is then etched by use of a reactive ion etcher using such resist pattern to form a protection layer A (9*a*) as a first protection layer as shown in FIG. 6C. Here, as reactive gas to be used by the reactive ion etcher, a mixed gas of $CF_4$ and $C_2F_6$ is applied.

Figure 6D:
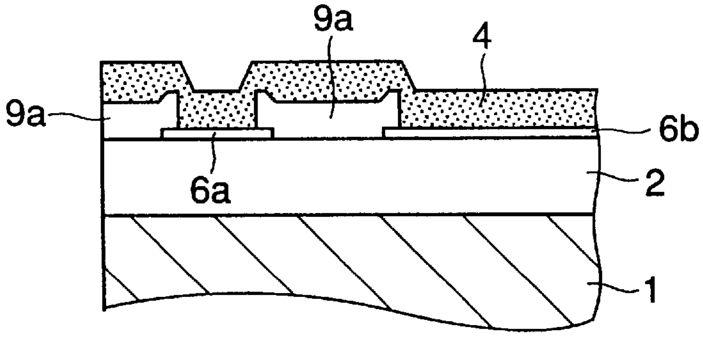

Second step: As shown in FIG. 6D, a film of Al of 1μm thick (the layer 4 formed by material for use of wiring electrode layers) is provided by means of sputtering all over the surface.

Figure 7A:
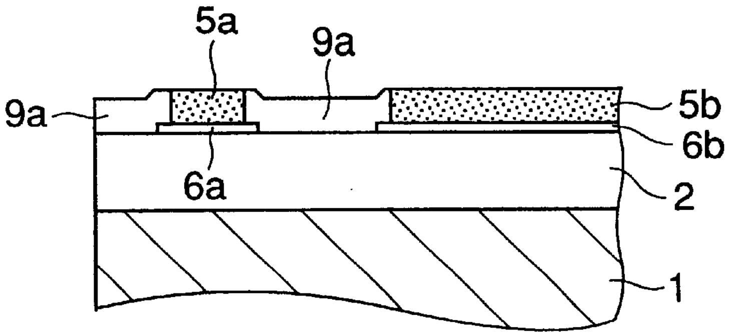
FIGS. 7A, 7B and 7C are cross-sectional views showing each step of a method of manufacture in accordance with the present invention.

Third step: In continuation, the surface of substrate is heated continuously (at 500° C. for 60 seconds), while it is not allowed to be exposed to the air outside, to form a pair of Al wiring electrode layers 5*a* and 5*b* as shown in FIG. 7A.

Figure 7B:
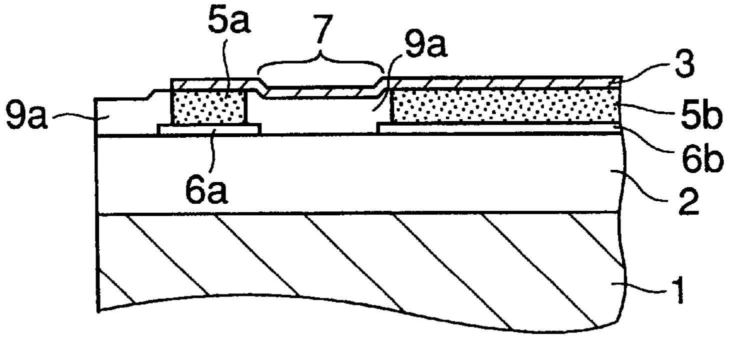
Figure 7C:
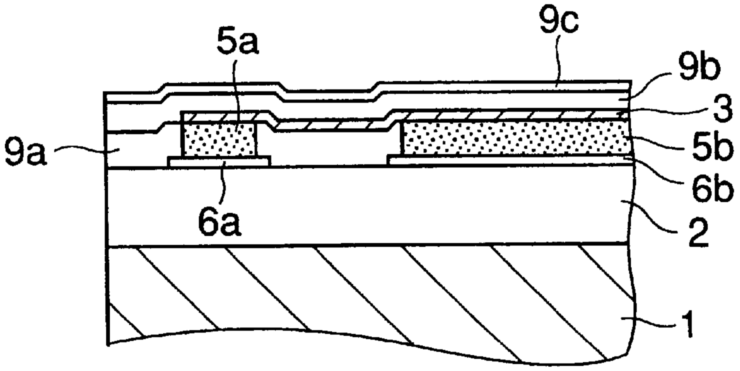

Fourth step: A film of $HfB_2$ is formed by means of sputtering in a thickness of 2,000 angstrom on the surface including each of these wiring electrode layers, and then, patterned to form a thin film resistive layer 3 of $HfB_2$ as shown in FIG. 7B.

Fifth step: All over the surface of the substrate after the fourth step, a protection layer B (9*b*) whose $SiO_2$ film thickness is 4,000 angstrom is formed by means of sputtering as a second protection layer, and a protection layer C (9*c*) whose Ta film thickness is 2,000 angstrom is formed also by means of sputtering on the protection layer B.

For the heater board obtained in accordance with the present embodiment, a structure is arranged so that the wiring electrode layers are provided on the lower side of the resistive layer. Therefore, it becomes possible to arrange a layer for protection against ink (the protection layer B) on the upper side of the resistive layer in a film thickens of less than half of the one conventionally adopted.

Using the heater board obtained as described above, an ink jet recording head is fabricated as shown in FIGS. 8A to 8D.

Embodiment 3

An ink jet recording head is fabricated in the same way as the embodiment 2 except that there are provided no think film electrode layers 6*a* and 6*b* in the first step. In this respect, when reactive ion etching is executed, the etching rate of the $SiO_2$ film is obtained in advance, and etching process is given only for the period of time required to etch to a given depth (1 $\mu$m).

Embodiment 4

Figure 10A:
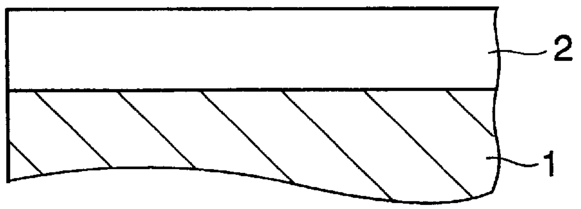
FIGS. 10A, 10B, 10C and 10D are cross-sectional views showing each step of a method of manufacture in accordance with the present invention.
Figure 10B:
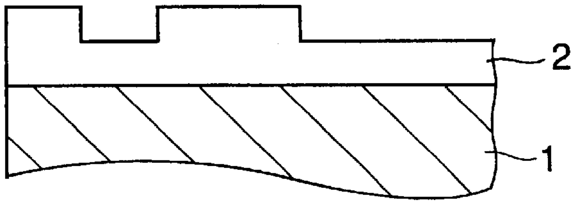
Figure 10C:
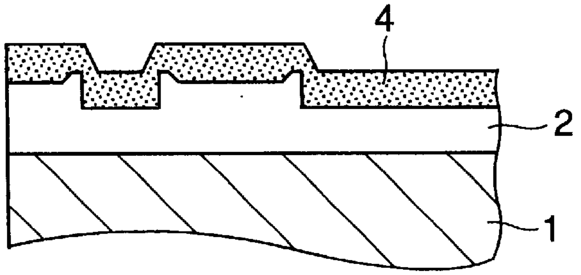
Figure 10D:
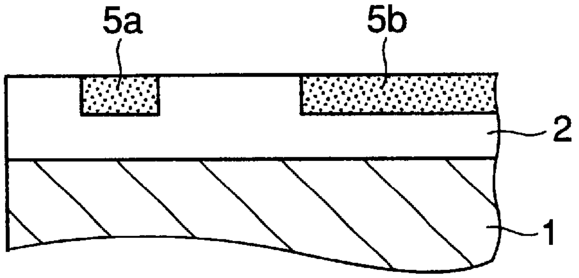
Figure 11A:
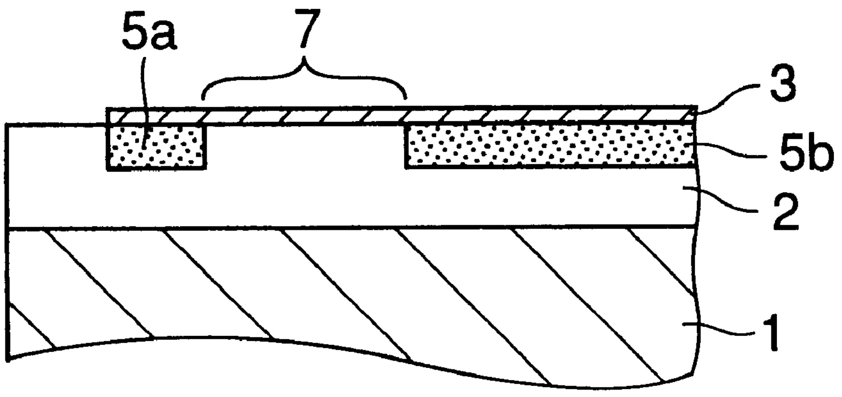
FIGS. 11A and 11B are cross-sectional views showing each step of a method of manufacture in accordance with the present invention.
Figure 11B:
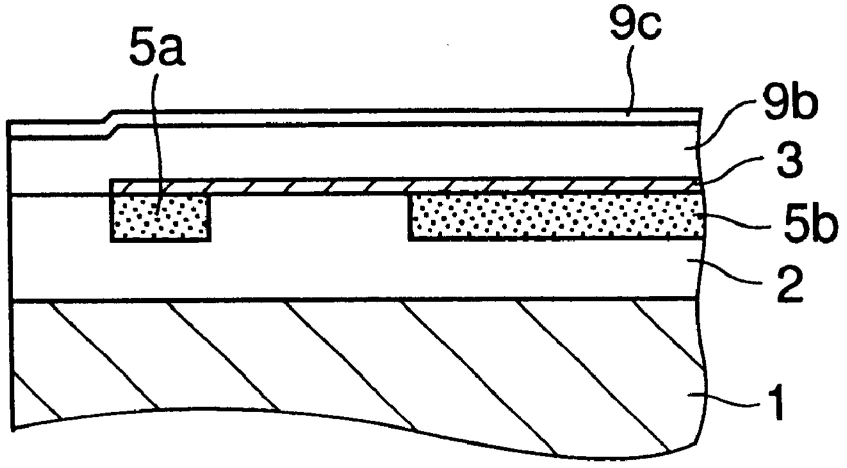

First step: As shown in FIG. 10A, a $SiO_2$ heat accumulation layer 2 is formed by means of thermal oxidation on a substrate 1 formed by Si wafer. Then, in the same condition as the embodiment 3, reactive ion etching is executed for a given period of time as described above to form a groove on the heat accumulation layer by removing an area for wiring electrode layers to be formed later (see FIG. 10B).

Second step: On the heat accumulation layer 2 and its groove, an Al film (a layer 4 formed by material for use of wiring electrode layers) is formed by means of sputtering in a thickness of 6,000 angstrom (see FIG. 10C).

Third step: This substrate is continuously heated (at 500° C. for 45 seconds), while it is not allowed to be exposed to the air outside. As a result, the Al film (the layer formed by material for use of wiring electrode layers) is caused to flow only into the groove of the heat accumulation layer formed in the first step. Thus, the surface becomes flat. Also, a pair of electrode layers 5*a* and 5*b* are formed (see FIG. 10D).

Fourth step: On the respective surfaces of the Al wiring electrode layers (5*a* and 5*b*) and the exposed heat accumulation layer 2, a resistive layer 3 is laminated as in the embodiment 2 (see FIG. 11E).

Fifth step: As protection layers, a protection layer B (9*b*) for protection against ink and a protection layer C (9*c*) for protection against cavitation are laminated one after another (see FIG. 11F)

With the heater board obtained as described above, an ink Jet recording head is fabricated as shown in FIGS. 8A to 8D.

The performances of the heater boards and ink jet recording heads produced for the embodiments 1 to 4, are examined by the method given below. In other words, at first, the protection layers and wiring electrode portions of each heater board, which are obtained by the execution of each embodiment, are observed and examined with respect to Al hillock and Al whiskers. Here, almost no Al hillock and whiskers are observed for all the heater boards produced for each of the embodiments. Then, each heater board obtained by the execution of each embodiment is kept in the shot bin having ink of the following composition in it at 60° C. and left intact for 24 hours (however, electrode pad portions are masked by resin). After that, its surface is observed and examined with respect to pin holes. Here, almost no pin holds are observed per square of 1 mm×1 mm for all the heater boards produced for each embodiment.

| Ink composition | |
|---|---|
| Project fast black 2(ICI) | 3.0 parts |
| Ethylene glycol | 15.0 parts |
| Sodium phosphate | 0.2 parts |
| Ammonium phosphate | 0.3 parts |
| Sodium citrate | 0.2 parts |
| Water | 81.3 parts |

Then, each ink jet recording head obtained by the execution of each embodiment is driven continuously in condition that the pulse width is set at 4.0 $\mu$sec; the driving frequency, at 6.0 kHz; and the K value (driving voltage/foaming voltage), at 1.3. It is confirmed that even after ink discharges of $5\times10^8$ shots, all the ink jet recording heads provide a good printing condition.

As described above, the heater boards and ink jet recording heads provided by each of the methods of manufacture of the present invention all demonstrate excellent reliability.

What is claimed is:

1. A method for manufacturing an ink jet recording head by combining each of the following steps to fabricate a heater board, comprising:

(I) a first step of forming on a substrate a resistive layer constituting a heat generating portion to supply thermal energy for discharging an ink to the ink, and patterning said resistive layer;

(II) a second step of forming a first protection layer on said substrate after said first step, and forming a groove portion by removing only an area portion of a wiring electrode layer to be formed later until said resistive layer is exposed;

(III) a third step of laminating a layer formed by material for use of said wiring electrode layer on said substrate after said second step so as to be electrically connected to said resistive layer;

(IV) a fourth step of continuously applying a heat treatment to a surface of said substrate after said third step to enable the material layer formed by the material for use of said wiring electrode layer to flow into only said groove portion of the first protection layer formed in said second step, making the surface flat, as a result thereof, at least a pair of wiring electrode layers being formed in a single-crystalline state, said resistive layer disposed between said pair of wiring electrode layers being arranged to be a heat generating portion as an electrothermal converting member; and (V) a fifth step of forming a second protection layer for covering said electrothermal converting member on said substrate after said fourth step.

2. A method for manufacturing an ink jet recording head according to claim 1, wherein said substrate is provided with a heat accumulation layer and said resistive layer is provided on the heat accumulation layer in said first step.

3. A method for manufacturing an ink jet recording head by combining each of the following steps to fabricate a heater board, comprising:

(I) a first step of forming a first protection layer in such a manner that a first wiring electrode layer is covered after forming a first wiring electrode layer on a substrate, and forming a groove portion by removing only an area portion of a second wiring electrode layer of the first protection layer until said first wiring electrode layer is exposed;

(II) a second step of laminating a layer formed by a material for use of said second wiring electrode layer on said substrate after said first step;

(III) a third step of continuously applying a heat treatment to a surface of said substrate after said second step to enable said layer formed by the material for use of said second wiring electrode layer to flow into only said groove portion of said first protection layer formed in said first step, making the surface flat, as a result thereof, at least a pair of wiring electrode layers being formed in a single-crystalline state, (IV) a fourth step of laminating a resistive layer constituting a heat generating portion to supply thermal energy for discharging an ink to the ink on said flat surface after said third step so as to be electrically connected to said pair of wiring electrode layers, and then patterning said resistive layer, as a result thereof, said resistive layer disposed between said pair of wiring electrode layers being arranged to be said heat generating portion as an electrothermal converting member; and (V) a fifth step of forming a second protection layer for covering said electrothermal converting member on said substrate after said fourth step.

4. A method for manufacturing an ink jet recording head according to claim 3, wherein said substrate is provided on the heat accumulation layer in said first step.

5. A method for manufacturing an ink jet recording head by combining each of the following steps to fabricate a heater board, comprising:

(I) a first step of forming a heat accumulation layer on a substrate, and forming a groove portion by removing a forming area for a wiring electrode layer of the heat accumulation layer;

(II) a second step of laminating a layer formed by a material for use of said wiring electrode layer on said substrate after said first step;

(III) a third step of continuously applying a heat treatment to a surface of said substrate after said second step to enable said layer formed by the material for use of said wiring electrode layer to flow into only said groove portion of the heat accumulation layer formed in said first step, making the surface flat, as a result thereof, at least a pair of wiring electrode layers being formed in a single-crystalline state;

(IV) a fourth step of laminating a resistive layer constituting a heat generating portion to supply thermal energy for discharging an ink to the ink on said flat surface after said third step so as to be electrically connected to said pair of wiring electrode layers, and then patterning said resistive layer, as a result thereof, said resistive layer disposed between said pair of wiring electrode layers being arranged to be said heat generating portion as an electrothermal converting member, and (IV) a fifth step of forming a protection layer for covering said electrothermal converting member on said substrate after said fourth step.

* * * * *

UNITED STATES PATENT AND TRADEMARK OFFICE
CERTIFICATE OF CORRECTION

PATENT NO. : 6,315,853 B1
DATED : November 13, 2001
INVENTOR(S) : Masahiko Kubota et al.

It is certified that error appears in the above-identified patent and that said Letters Patent is hereby corrected as shown below:

Title page,
Item [56] References Cited, under FOREIGN PATENT DOCUMENTS:

"59123670" should read -- 59-123670 --; and
"59138461" should read -- 59-138461 --; and
"61125858" should read -- 61-125858 --; and
"5177836 7/1993 (JP." should be deleted.

Column 1,
Line 49, "Jet" should read -- jet --;
Line 54, "Jet" should read -- jet --.

Column 2,
Line 46, "allow" should read -- allows --.

Column 4,
Line 14, "all" should read -- al. --.

Column 7,
Line 30, "10" should be deleted; and
Line 36, "Juncture" should read -- juncture, --.

Column 8,
Line 3, "Forth" should read -- Fourth --; and
Line 13, "Juncture," should read -- juncture, --.

Column 9,
Line 28, "Jet" should read -- jet --.

Column 11,
Line 45, "six" should read -- sixth --.

Column 12,
Line 12, "Jet" should read -- jet --.

Column 13,
Line 17, "constitutes" should read -- constituents --; and
Line 30, "made." should read -- made --.

UNITED STATES PATENT AND TRADEMARK OFFICE

CERTIFICATE OF CORRECTION

PATENT NO. : 6,315,853 B1
DATED : November 13, 2001
INVENTOR(S) : Masahiko Kubota et al.

It is certified that error appears in the above-identified patent and that said Letters Patent is hereby corrected as shown below:

Column 15,
Line 64, "Forth" should read -- Fourth --; and
Line 65, "the" should read -- to the --.

Column 16,
Line 59, "thickens" should read -- thickness --.

Column 17,
Line 29, "11)" should read -- 11F). --; and
Line 31, "Jet" should read -- jet --.

Column 18,
Line 57, "state," should read -- state; --.

Column 20,
Line 14, "member," should read -- member; --.

Signed and Sealed this

Twenty-first Day of May, 2002

*Attest:*

JAMES E. ROGAN

*Attesting Officer*

*Director of the United States Patent and Trademark Office*